(12) United States Patent
Whitlow et al.

(10) Patent No.: US 12,196,318 B1
(45) Date of Patent: *Jan. 14, 2025

(54) METAL O-RING SEAL

(71) Applicant: Technetics Group LLC, Charlotte, NC (US)

(72) Inventors: Mark S. Whitlow, Columbia, SC (US); James S. Hicks, Clinton, SC (US); Florent Ledrappier, St. Paul Trois Chateaux (FR); Jean-Francois Juliaa, Montelimar (FR); Christophe Darles, Venejan (FR)

(73) Assignee: TECHNETICS GROUP LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,584

(22) Filed: Aug. 24, 2023

Related U.S. Application Data

(63) Continuation of application No. 17/405,630, filed on Aug. 18, 2021, now Pat. No. 11,754,185.

(60) Provisional application No. 63/069,520, filed on Aug. 24, 2020.

(51) Int. Cl.
*F16J 15/3284* (2016.01)

(52) U.S. Cl.
CPC .................. *F16J 15/3284* (2013.01)

(58) Field of Classification Search
CPC .................. F16J 15/0893; F16J 15/3284
See application file for complete search history.

(56) References Cited

U.S. PATENT DOCUMENTS

| 11,754,185 B1 | 9/2023 | Whitlow et al. |
| 2009/0058016 A1 | 3/2009 | Smith et al. |
| 2015/0345642 A1 | 12/2015 | Haas et al. |

FOREIGN PATENT DOCUMENTS

KR 20120136815 A 12/2012

*Primary Examiner* — Gilbert Y Lee
(74) *Attorney, Agent, or Firm* — Husch Blackwell LLP

(57) ABSTRACT

A metal O-ring is provided. The metal O-ring has a sidewall with an outer surface and an inner surface. The outer surface of the sidewall is machined to selectively thinning the thickness of the sidewall, such that the sidewall of the of the metal O-ring has a plurality of thicknesses equal to or less than a maximum thickness and equal to or more than a minimum thickness. Selectively thinning the sidewall by machining the outer surface allows for control of the elasticity of the metal O-ring. Controlling the elasticity of the metal O-ring, and potentially increasing the spring back, may provide for increased contract pressure at a sealing interface, which would facilitate sealing. The machined outer surface of the metal O-ring are generally machined to flat surfaces.

19 Claims, 6 Drawing Sheets

METAL O-RING SEAL

CROSS-REFERENCE TO RELATED PATENT APPLICATIONS

This application is a continuation of U.S. patent application Ser. No. 17/405,630, filed Aug. 18, 2021 entitled "METAL O-RING SEAL," which claims priority to and benefit of U.S. Provisional Application No. 63/069,520, filed Aug. 24, 2020 entitled "METAL O-RING SEAL," both of which are hereby incorporated by reference in their entirety.

BACKGROUND

The technology of the present application relates to metal seals and, more particularly, to metal O-ring seals.

Conventionally, metal O-ring seals are manufactured by first forming a standard metallic tube. The metallic tube is cut to form the metal O-ring. Traditional metal O-rings are based on standard, specific cross section diameters and wall thicknesses. Deviations from the standard diameters and wall thicknesses greatly increase the costs of the metal O-rings because custom tubing needs to be drawn, which is time consuming and costly. Generally speaking, conventional metal O-rings have a contestant wall diameter.

While functional, the traditional metal O-ring seal has limitations. Among the limitations are limited sealing performance due to, among other things, limited contact pressure (measured as load/unit area). Another contributing factor to the limited sealing performance is that the conventional metal O-ring has a recognized lack of resiliency, sometimes referred to as spring back.

The limited or lack of robust resiliency for traditional metal O-rings is a known problem. One solution includes WO2013151358 titled Highly Resilient Metal O-ring Seal (the "358 Publication"). The 358 Publication provides for a metal O-ring having a cross section forming a circular, constant outer diameter along with an elliptical inner diameter. The metal O-ring seal further has a pair of opposed protrusions extending towards the geometric center of the cross section. Grooves are formed on opposite sides of each protrusion. Although resilient, the metal O-ring seal of the 358 Publication is difficult and expensive to manufacture. In fact, the metal O-ring of the 358 Publication is akin to a custom drawn tube discussed above.

Thus, against this background, it would be desirable to provide an improved metal O-ring seal and, in particular, an improved metal O-ring seal that can be formed from standard tubes from which conventional O-rings are manufactured.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a metal O-ring is provided. The metal O-ring has a sidewall with an outer surface and an inner surface. The outer surface of the sidewall is machined to selectively thin the thickness of the sidewall, such that the sidewall of the of the metal O-ring has a plurality of thicknesses equal to or less than a maximum thickness and equal to or more than a minimum thickness. Selectively thinning the sidewall by machining the outer surface allows for control of the elasticity of the metal O-ring. Controlling the elasticity of the metal O-ring, and potentially increasing the spring back, may provide for increased contract pressure at a sealing interface, which would facilitate sealing.

In some embodiments, a metal O-ring is provided. The metal O-ring includes a metal tube formed by a sidewall where the sidewall comprises an inner surface having a constant inner diameter and an outer surface having a plurality of outer diameters between a maximum outer diameter and a minimum outer diameter, wherein the outer surface of the sidewall is machined such that the sidewall has a plurality of thicknesses between a maximum thickness and a minimum thickness. In some aspects, the metal O-ring as described may have the outer surface of the sidewall machined to have at least a pair of flat outer surfaces.

In some aspects, the metal O-ring as described above may having the outer surface of the sidewall machined to have a plurality of flat outer surfaces and a plurality of curved outer surfaces. The plurality of curved outer surfaces may have a constant outer diameter and a constant sidewall thickness and the plurality of thicknesses are along the plurality of flat outer surfaces. In some aspects, the flat surface may be replaced by machined surfaces that not essentially flat, but still selectively thin the sidewall.

In some aspects, the metal O-ring may have the outer surface of the sidewall machined to form a plurality of convex outer surfaces, a plurality of conical surface, a plurality of concave outer surfaces, or a combination thereof.

In some aspects, the metal O-ring as described above will include at least a pair of opposed sealing points configured to sealingly engage a joint. The sealing points may be configured to form a surface seal interface, a line seal interface, or a combination thereof.

In some aspects, the metal O-ring as described above may include a plurality of flat outer surfaces where at least one of the flat outer surfaces includes a pair of flat portions angulated with respect to each other and forming at least one of a peak, a valley, or a combination thereof, e.g., converging or diverging.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to metal O-ring seals. However, the technology described herein may be used with applications other than those specifically described herein. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
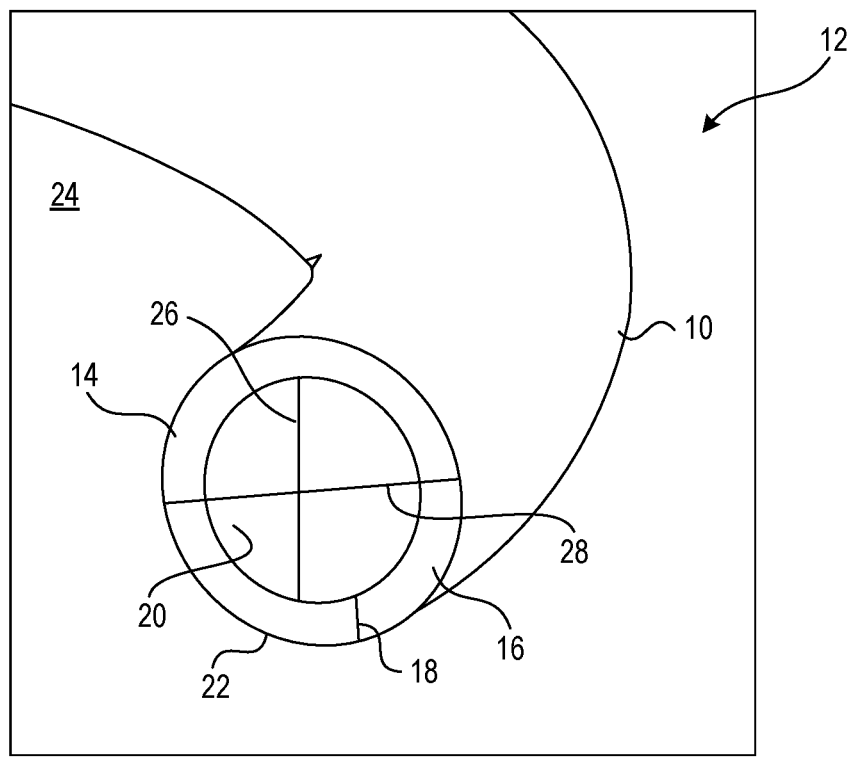
FIG. 1 is a partial perspective view and cross-sectional view of a metal O-ring.
Figure 2:
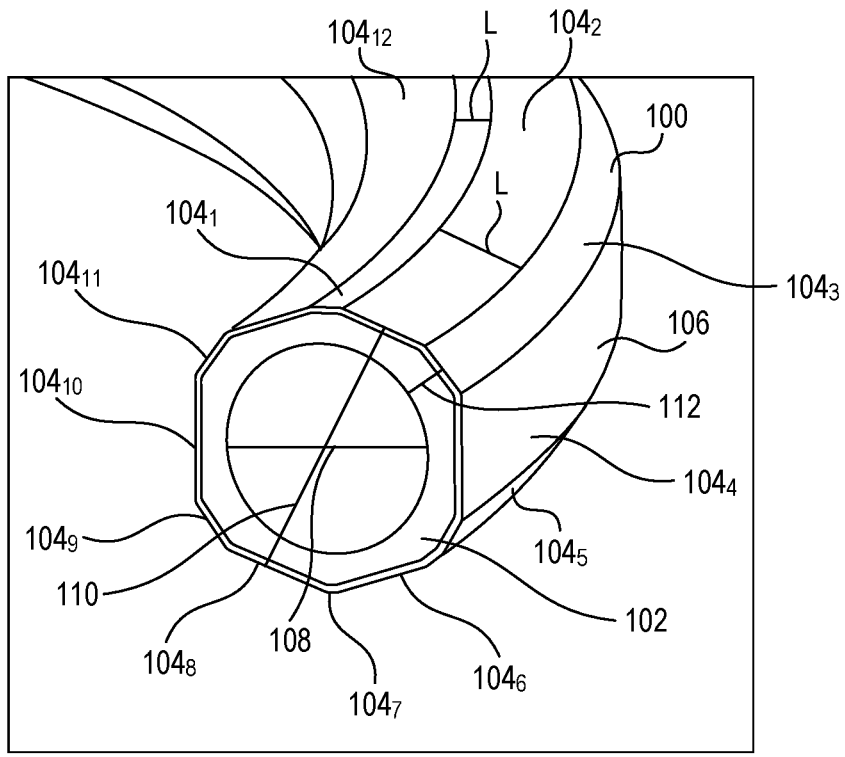
FIG. 2 is a partial perspective view and cross-sectional view of a metal O-ring consistent with the technology of the present application.

With reference now to FIGS. 1 and 2, formation of a metal O-ring 100 consistent with the technology of the present application is shown. Starting with FIG. 1, a conventional O-ring 10 is provided. The conventional O-ring 10, as discussed above, is relatively inexpensively obtained via standard tubing presently available. Although discussed with a conventional O-ring 10, the technology of the present application could be used with a custom tube for a custom O-ring. The conventional O-ring 10 is only partially shown. As can be appreciated, the O-ring 10 has a circular or annular shape 12. As shown in FIG. 1, the O-ring 10 is provided with a circular cross section 14. The O-ring is formed by an annular sidewall 16 having a constant wall thickness 18. The annular sidewall 16 has an inner surface 20 and an outer surface 22. For completeness, the metal O-ring 10 may be formed in any conventional way. In one exemplary embodiment, the metal O-ring is produced through coiling straight lengths of circular cross-section tubing. The tubing is formed into helical coils with a common axis for the coils. The coils are cut into a single loop and the ends of the loop are welded together.

The O-ring 10 forms an aperture 24. As shown by the cross section, the metal O-ring 10 is hollow having, when uncompressed, a constant inner diameter 26 and outer diameter 28. The inner diameter 26 plus the wall thickness 18 equals the outer diameter 28. While not shown, the metal O-ring may have an elliptical cross-sectional shape. While the diameters may change for such a metal O-ring, the sidewall would nonetheless have a constant thickness.

To form the metal O-ring 100 consistent with the technology of the present application, the metal O-ring 10 is machined to form the metal O-ring 100. The metal O-ring 100 after machining has a sidewall 102 with at least a pair of flat outer surfaces 104 on the outer surface 106 of the sidewall 102. As shown, the metal O-ring 100 has a plurality of flat outer surfaces 104 (for a total of 12 flat outer surfaces $104_{1\text{-}12}$). It should be noted that all the surfaces need not be machined. The flat outer surface 104 may be referred to as facets. As can be appreciated, for loading the metal O-ring 100 should have the flat outer surfaces arranged symmetrically. Thus, for a pair of flat outer surfaces, the pair would be located generally at, for example 3:00 and 9:00 on a conventional clock face. For three (3) flat outer surfaces, the flat surfaces would be located at 12:00, 4:00, and 8:00. For four (4) flat outer surfaces, the flat surfaces would be located at, for example, 11:00, 2:00, 5:00, and 8:00. The metal O-ring 100 may have as few as a pair of flat outer surfaces 104 or as many as may be machined. Also, as shown in cross section, the flat outer surfaces have variable lengths L. As shown in FIG. 2, the metal O-ring 100 has the entire sidewall 102 machined to form a plurality of surfaces 104. The machined surfaces may be a variety of shapes including flat, conical, concave, or convex with a different radius of curvature than the remainder of the unmachined surfaces. The metal O-ring 100 has a circular shape cross-section such that an inner surface has a constant inner diameter 108. The outer surface has a plurality of outer diameters 110 ranging from a minimum outer diameter to a maximum outer diameter, again assuming a generally circular shape. The sidewall 102, at least where machined, has a plurality of sidewall thicknesses 112. Across any given diameter, the inner diameter 108 plus the sidewall thickness 112 equals the outer diameter 110. The sidewall thickness is generally the minimum at about the center length of the longest L flat surface. In some instances, the machined outer surface may be machined such that the outer surface transitions between a convex shape (generally unmachined) and a concave shape (generally machined).

As discussed above, the metal O-ring is formed by obtaining a standard drawn metal tube. The drawn metal tube is formed into an O-ring. Once the O-ring is formed, the outer surface of the O-ring is machined to provide facets where the sidewall has a reduced thickness. In the alternative, the standard drawn metal tube, while straight, can having the outer surface of the sidewalls machined to form facets. Subsequently, the machined metal tube can be formed into a metal O-ring consistent with the technology of the present application.

Figure 3:
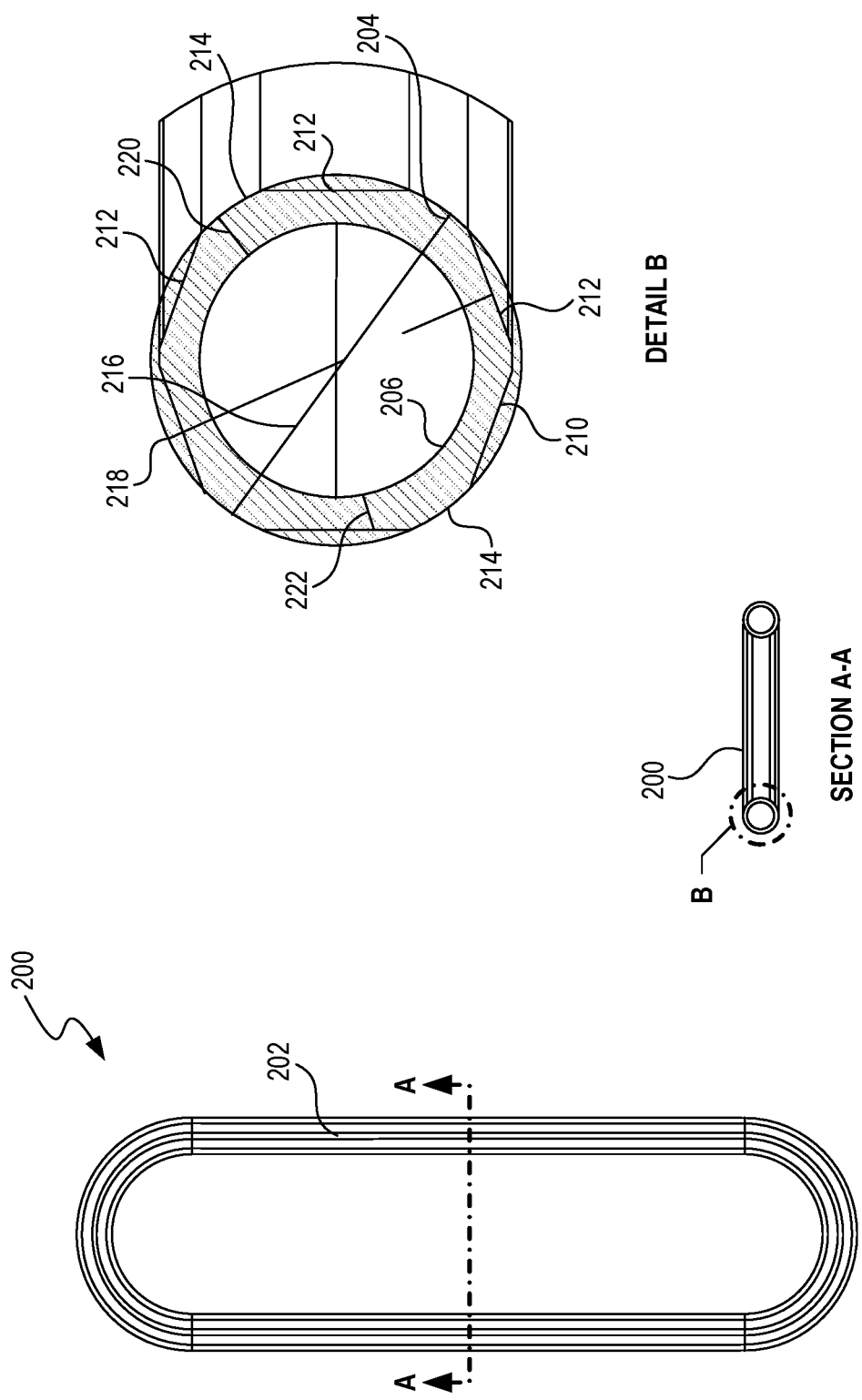
FIG. 3 is an elevation view and a cross-section view of a metal O-ring consistent with the technology of the present application.

FIG. 3 shows another metal O-ring 200 consistent with the technology of the present application. O-ring 200 forms a racetrack shape 202. The metal O-ring 200 as shown in cross section has a sidewall 204 with an inner surface 206 forming a constant inner diameter 208, with a generally circular shape. The outer surface 210 of the sidewall is formed by a plurality of machined, flat surfaces 212 and a plurality of curved surfaces 214. In this case, there are six (6) flat surfaces 212 and six (6) curved surfaces 214. The curved surfaces 214 have a constant radius of curvature. While shown as flat surfaces 212, the flat surfaces are machined with a variable radius of curvature. The curved surfaces 214 may be machined as well. Also, the pattern of curved surface 214, facet surface 212, curved surface 214, facet surface 212, may be referred to as an alternating pattern.

The curved surfaces 214 define an outer diameter 216. Generally, the outer diameter 216 is a constant outer diameter. In other words, the arc of the radius for each curved surface is the same. The flat surfaces 212 define a plurality of outer diameters 218. Also, the curved surfaces 214 have a generally constant curved wall thickness 220. The flat surfaces 212 generally define a plurality of wall thicknesses 220. Again, the narrowest wall thickness is between the flat surface 212 (at about a center of its length) and the inner surface 206. In some aspects of the technology, rather than machining flat outer surfaces, the outer surface may be machined to have a divot or hollow. For example, if the curved surface 214 are considered convex curved surfaces, the flat surfaces 212 may be replaced by concaved curved surfaces to accomplish the same effect. While described as machining, the outer surfaces may be chemically treated to selectively thin the walls or mechanically machined such as by grinding.

The flat surfaces 212, in some embodiments, may comprise multiple flat portions. In other words, what is shown as a single machined flat surface may include a pair of flat portions forming a peak (converging flat portions) and/or a valley (diverging flat portions).

Figure 4:
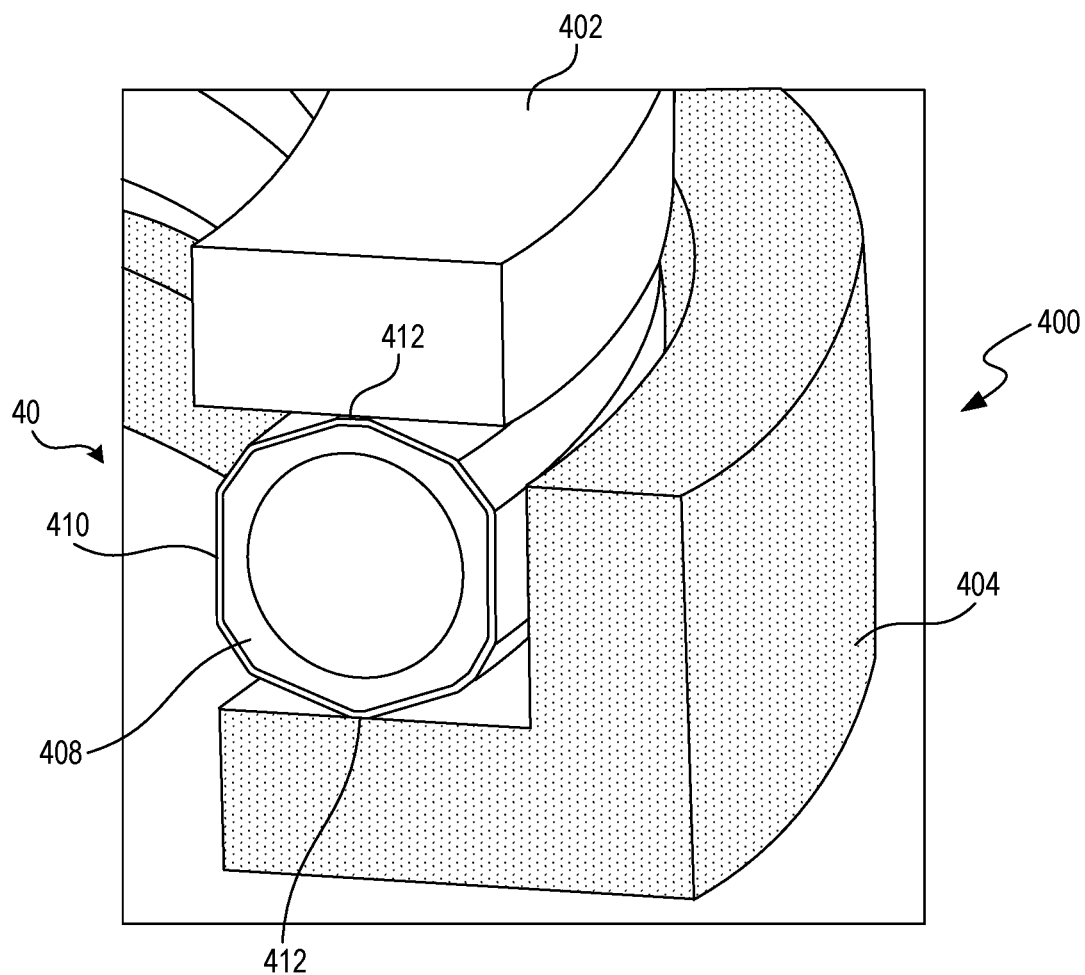
FIG. 4 is partial perspective view and cross-sectional view of a metal O-ring in a joint consistent with the technology of the present application.

With reference now to FIG. 4, a joint 400 is shown. The joint 400 includes a first part 402 and a second part 404 forming a space 406 therebetween. A metal O-ring 408 resides in the space 406. The metal O-ring 408 may be, for example, the metal O-ring 100 as shown or another similar metal O-ring with at least a pair of opposed machined flat surface 410.

The metal O-ring 408 has opposed seal points 412 that contact the first part 402 and the second part 404 of the joint 400. The metal O-ring 408 may include a pair of opposed flat surfaces, such as surfaces 410, at the opposed seal points 412. Forming the seal points 412 from opposed flat surfaces provides a surface seal interface rather than a line seal interface with the first part 402 and the second part 404. Metal O-ring 408 is formed with opposed seal points 412 being curved surfaces that form line seal interfaces with the first part 402 and the second part 404 of the joint 400.

Figure 5:
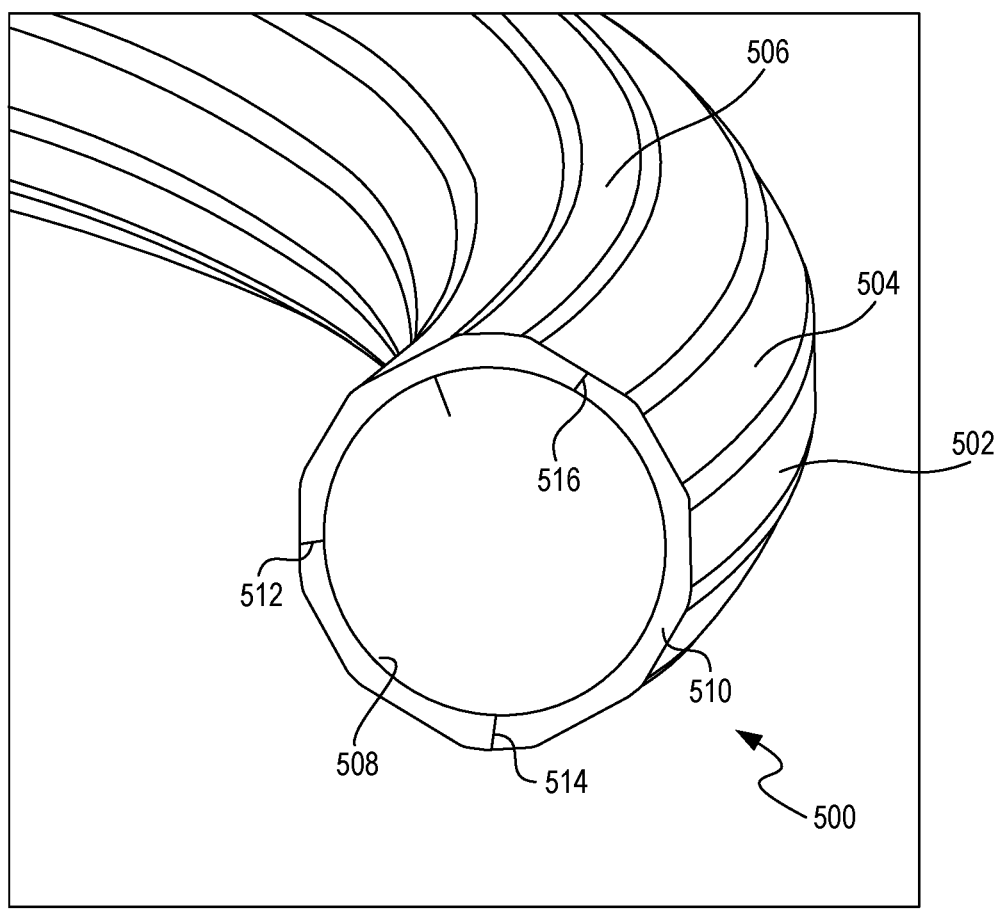
FIGS. 5-7 are partial perspective views and cross-sectional view of metal O-rings consistent with the technology of the present application.
Figure 6:
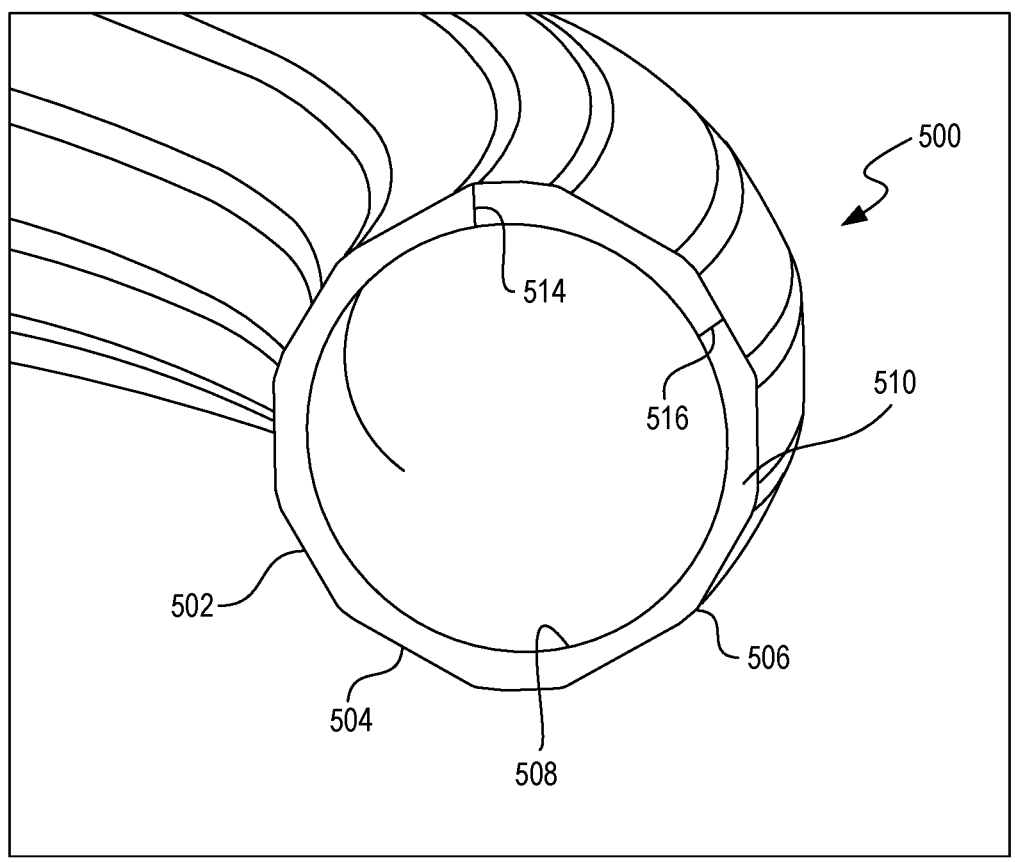
Figure 7:
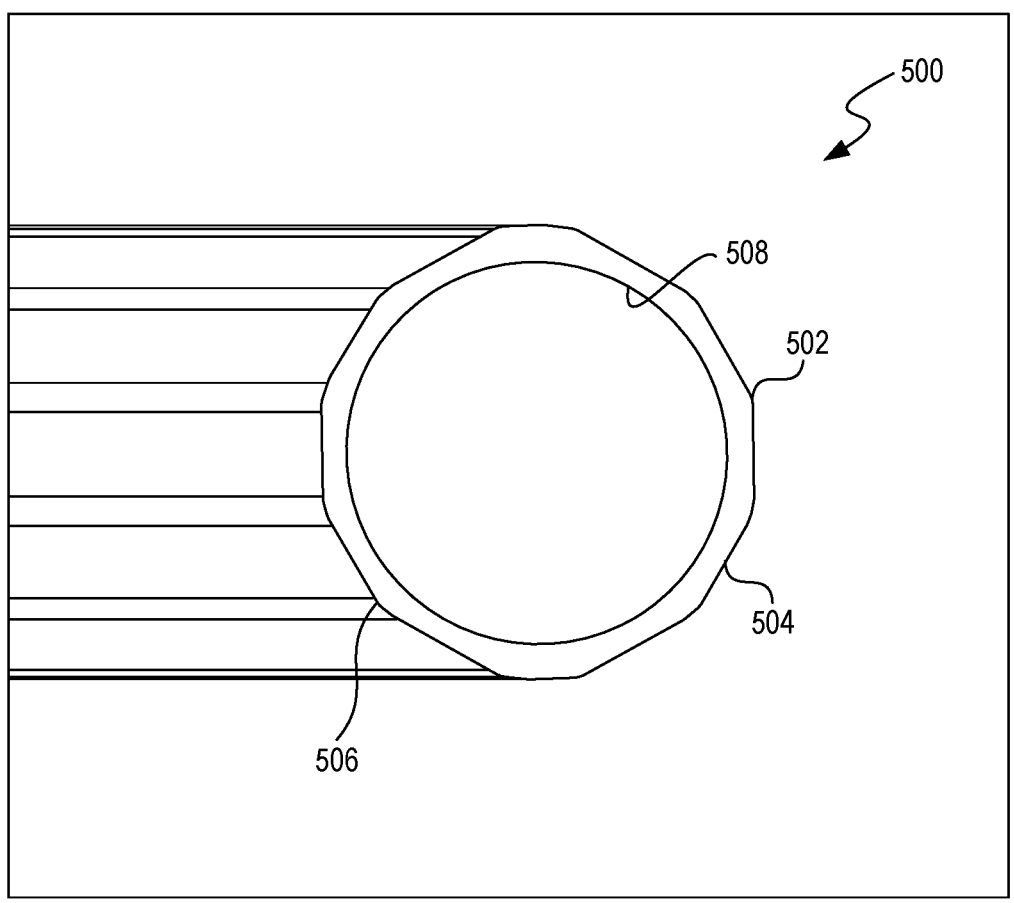

With reference now to FIGS. 5-7, metal O-rings 500 consistent with the technology of the present application are shown. As can be appreciated, the metal O-rings 500 generally have a generally polygonal shaped outer surface 502 where the outer surface has a plurality of machined or formed flat outer surface 504. The outer surface 502 may, in some instances, have a plurality of curved outer surfaces 506 (FIG. 6). The inner surface 508 is a curved surface having a constant radius of curvature or constant diameter. The sidewall 510, as can now be appreciated, has a plurality of thicknesses 512. The thicknesses range from a maximum thickness 514 to a minimum thickness 516. The minimum thickness is generally located at the middle of the longest of the flat outer surfaces.

The variable thickness of the sidewall, such as sidewall 510 in FIGS. 5 and 6, increases the elasticity of the metal O-ring, which is consistent with the other metal O-rings described herein, such as O-rings 100, 200, 408, and 500. The increase in the elasticity is due, in part, to the thinning of the sidewalls by the machining of the outer surface in each case. The increased resiliency results in an increase in the contact pressure, such as at the sealing interface 412, whether a surface seal interface or a line seal interface. Also, by machining the outer surface of the sidewalls to increase the elasticity of the metal O-ring, it is possible to control the amount of thinning of the sidewall. By controlling the amount of thinning of the sidewall, and hence the elasticity, the compressive load to effectuate a seal may be controlled as well. Generally, the thinner the sidewall, the less compressive force needs to be applied to seal the joint, such as joint 400.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A metal O-ring comprising,
a metal tube formed by a sidewall;
the sidewall comprising:
an inner surface having a constant inner diameter;
an outer surface having a plurality of outer diameters between a maximum outer diameter and a minimum outer diameter, wherein the outer surface of the sidewall is machined such that the sidewall has a plurality of thicknesses between a maximum thickness and a minimum thickness; and
wherein the sidewall comprises at least a pair of opposed facets where the sidewall is machined, and
wherein the sidewall comprises at least a pair of opposed sealing points.

2. The metal O-ring of claim 1 wherein the opposed facets comprise flat outer surfaces.

3. The metal O-ring of claim 2 wherein the outer surface comprises a plurality of curved outer surfaces.

4. The metal O-ring of claim 3 wherein the plurality of curved outer surfaces comprises a constant outer diameter and a constant sidewall thickness.

5. The metal O-ring of claim 4 wherein the plurality of thicknesses are along the plurality of flat outer surfaces.

6. The metal O-ring of claim 3 wherein at least one flat outer surface of the plurality of flat outer surfaces comprises a pair of flat portions forming at least one of a peak, a valley, or a combination thereof.

7. The metal O-ring of claim 1 wherein the outer surface of the sidewall is machined to form a plurality of convex outer surfaces and a plurality of concave outer surfaces.

8. The metal O-ring of claim 1 wherein the outer surface is configured to sealingly engage a joint.

9. The metal O-ring of claim 8 wherein the pair of opposed sealing points are configured to form a line seal interface.

10. A joint in a fluid media flow system, comprising:
a first part of the joint;
a second part of the joint;
a space separating the first part of the joint and the second part of the joint; and
a metal O-ring in the space between the first part and the second, the metal O-ring comprising:
an inner surface having a constant inner diameter;

an outer surface, wherein the outer surface of the sidewall is machined such that the sidewall has a plurality of thicknesses between a maximum thickness and a minimum thickness; and wherein the sidewall comprises at least a pair of opposed facets where the sidewall is machined, and wherein the sidewall comprises at least a pair of opposed sealing points.

11. A method of making a metal O-ring comprising, obtaining a metal tube with a sidewall having an inner surface and an outer surface, wherein the sidewall has a constant sidewall thickness between the inner surface and the outer surface; and machining the outer surface of the sidewall such that at least a pair of facets are formed on the outer surface of the sidewall and the sidewall has a variable thickness wherein the minimum thickness of the sidewall is along the pair of facets and wherein at least a pair of opposed sealing points are formed on the sidewall, such that a metal O-ring with selectively reduced outer surfaces is provided.

12. The method of claim 11 wherein the pair of facets are machined to flat surfaces.

13. The method of claim 11 wherein machining the outer surface of the sidewall forms a plurality of facets and a plurality of curved surfaces in an alternating pattern.

14. The method of claim 11 wherein the metal tube is formed into an O-ring prior to machining.

15. The method of claim 11 wherein the metal tube is formed into an O-ring subsequent to machining.

16. The method of claim 11 wherein the machining step is a mechanical machining.

17. The method of claim 11 wherein the machining step is a chemical machining.

18. The method of claim 11 further comprising sealing a joint by placing the metal O-ring with selectively reduced outer surfaces between a first part of a joint and a second part of the joint and compressing the metal O-ring with selective reduced outer surfaces.

19. The method of claim 11 wherein the machining step symmetrically forms the facets.

* * * * *